United States Patent [19]

Cline

[11] 4,024,756
[45] May 24, 1977

[54] COMPUTER TYPE BRAKE ANALYZER

[75] Inventor: Edwin Lee Cline, Pasadena, Calif.

[73] Assignee: Clayton Manufacturing Company, El Monte, Calif.

[22] Filed: May 30, 1975

[21] Appl. No.: 574,271

Related U.S. Application Data

[63] Continuation-in-part of Ser. No. 382,538, July 25, 1973, Pat. No. 3,899,916, which is a continuation-in-part of Ser. No. 811,168, March 27, 1969, abandoned.

[52] U.S. Cl. .................................... 73/132
[51] Int. Cl.² ................................ G01L 5/28
[58] Field of Search ............ 73/126, 123, 132, 117

[56] References Cited
UNITED STATES PATENTS

| | | | |
|---|---|---|---|
| 3,365,940 | 1/1968 | MacMillan | 73/126 X |
| 3,554,023 | 1/1971 | Geul | 73/126 X |

Primary Examiner—Jerry W. Myracle
Attorney, Agent, or Firm—Jackson & Jones

[57] ABSTRACT

An apparatus for analyzing the performance of wheeled, land vehicle brake systems is described wherein means are provided for driving the vehicle wheels at a predetermined speed and the operator or computer controlled brake actuator selectively applies the brakes in a series of simple successive steps comprising the test sequence. The pedal force, or other actuating force, the brake effort exerted by each wheel, and the imbalance between the braking effort of opposite wheels is measured and recorded on a strip chart or fed to a computer, to determine if the measured values fall outside of a predetermined range of values representing acceptable deviations from standard values. Any deviation of the brake effort from the acceptable values, or excessive imbalance between opposite wheels at any point in the test sequence, may be used as a basis for diagnosing and identifying a specific brake malfunction. The system can be enlarged to simultaneously test the brakes on all wheels of a land vehicle.

18 Claims, 10 Drawing Figures

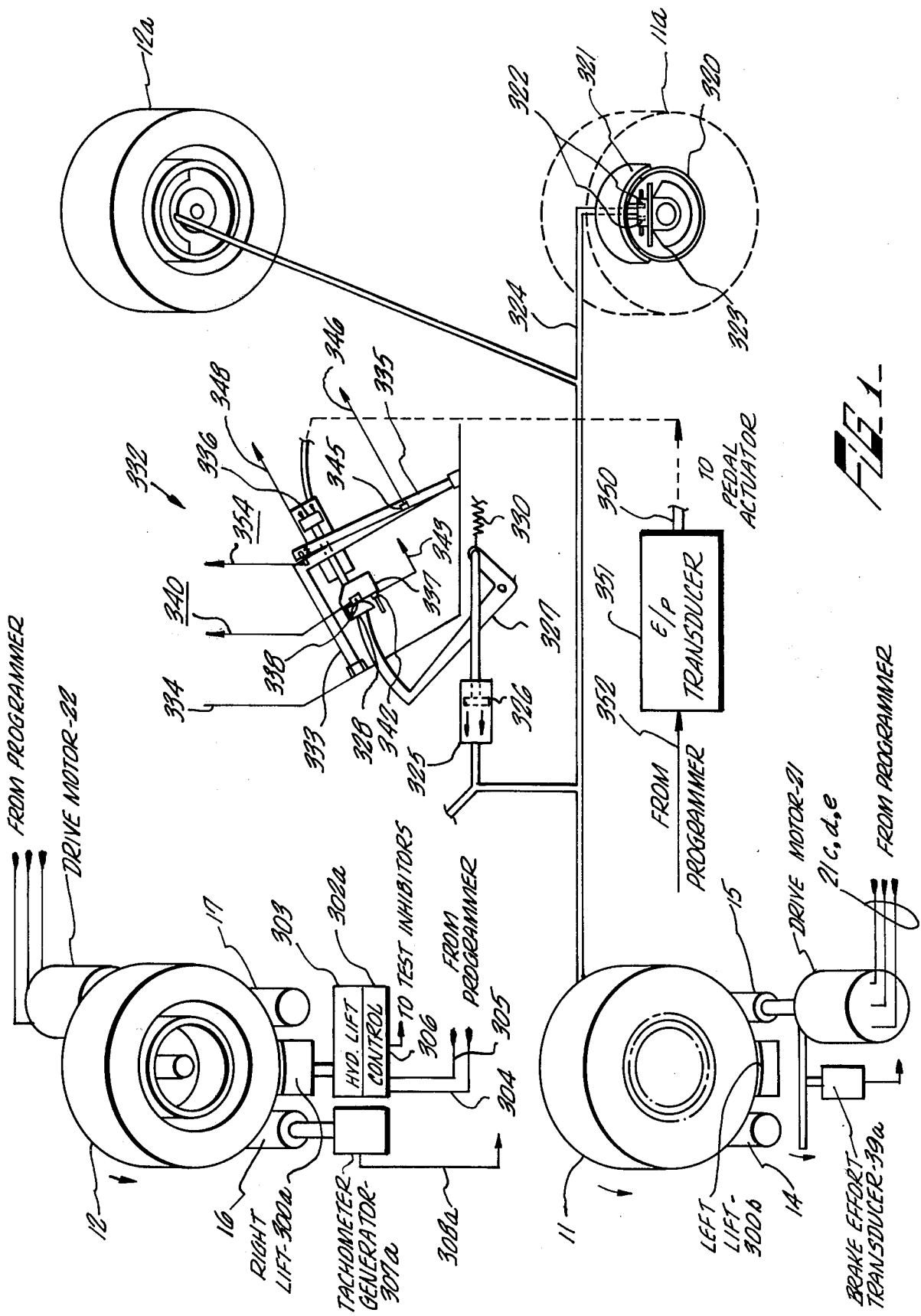

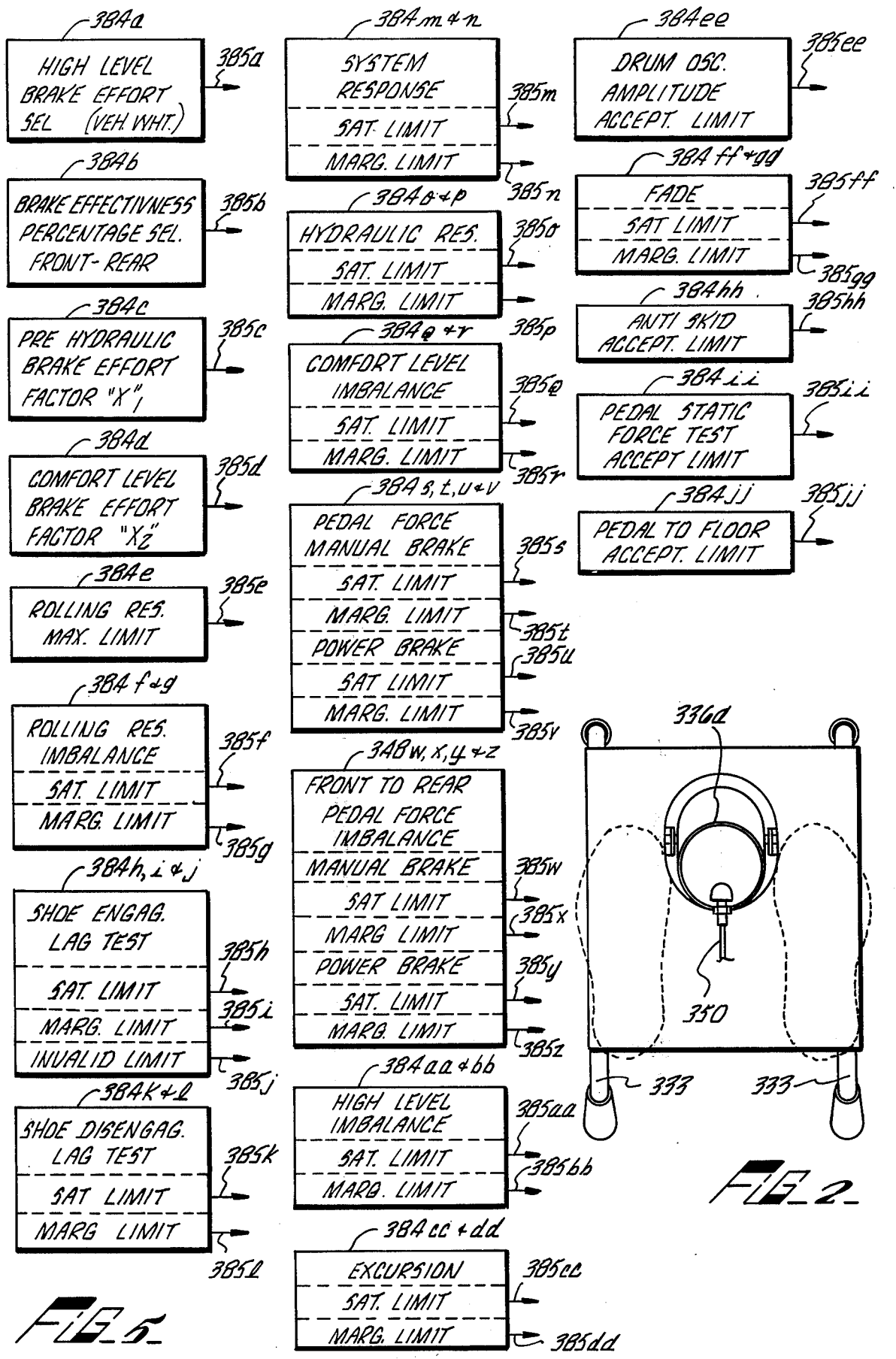

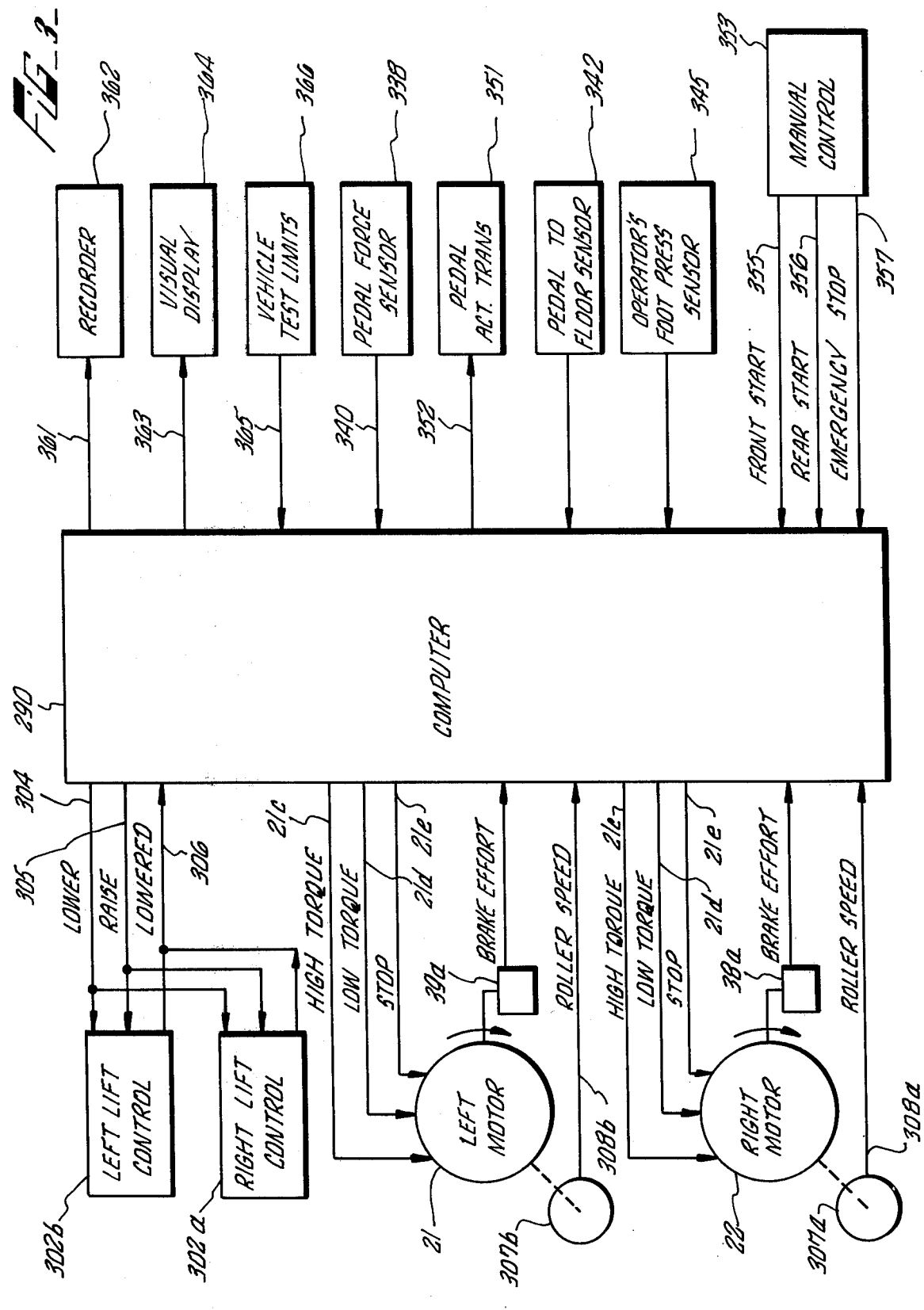

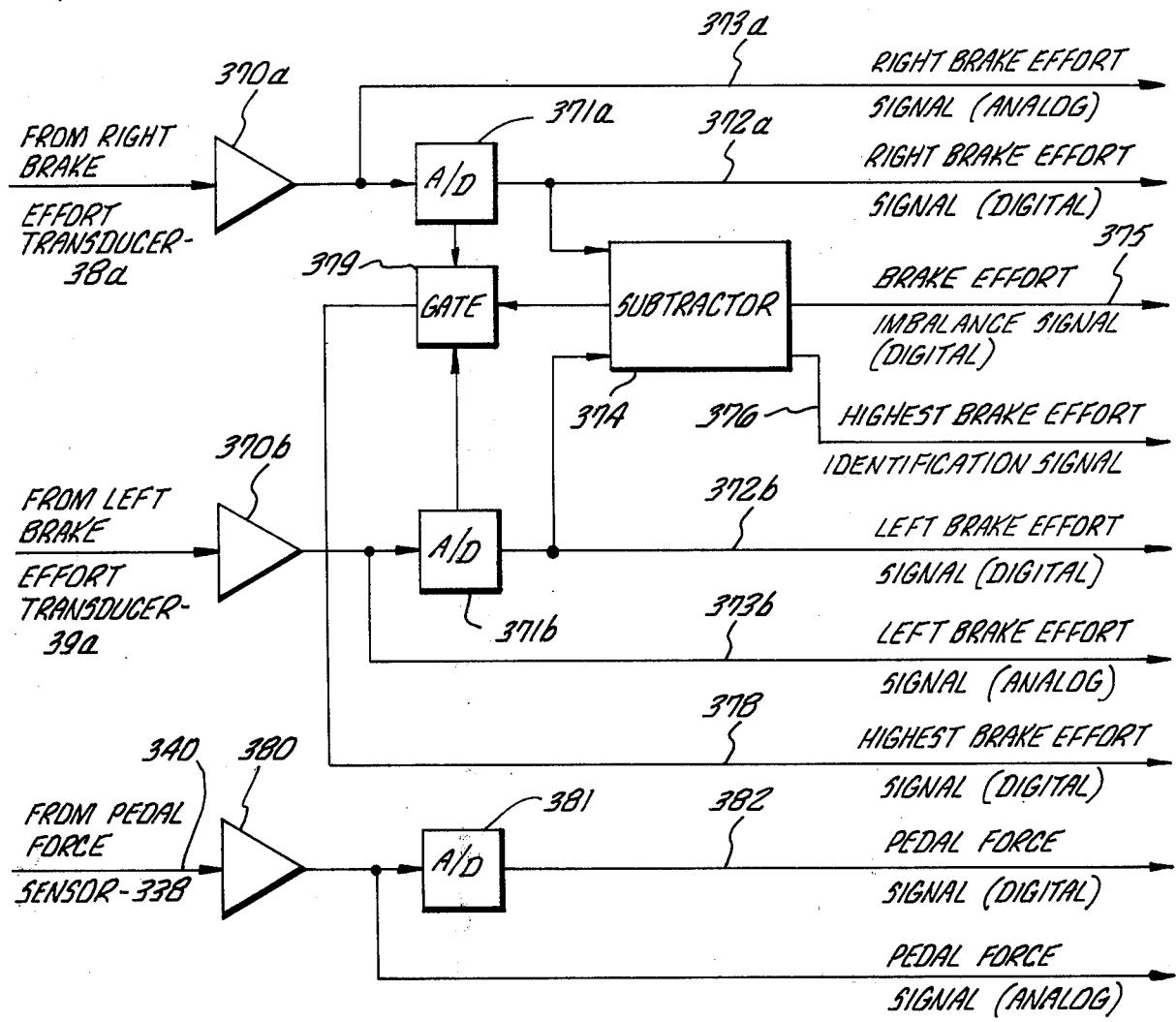
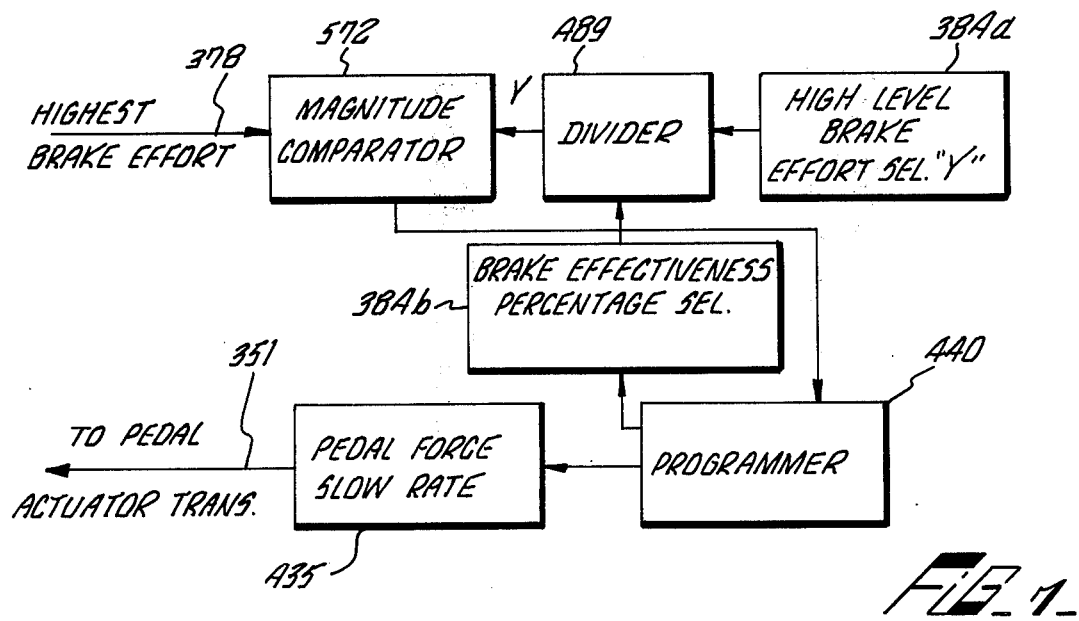

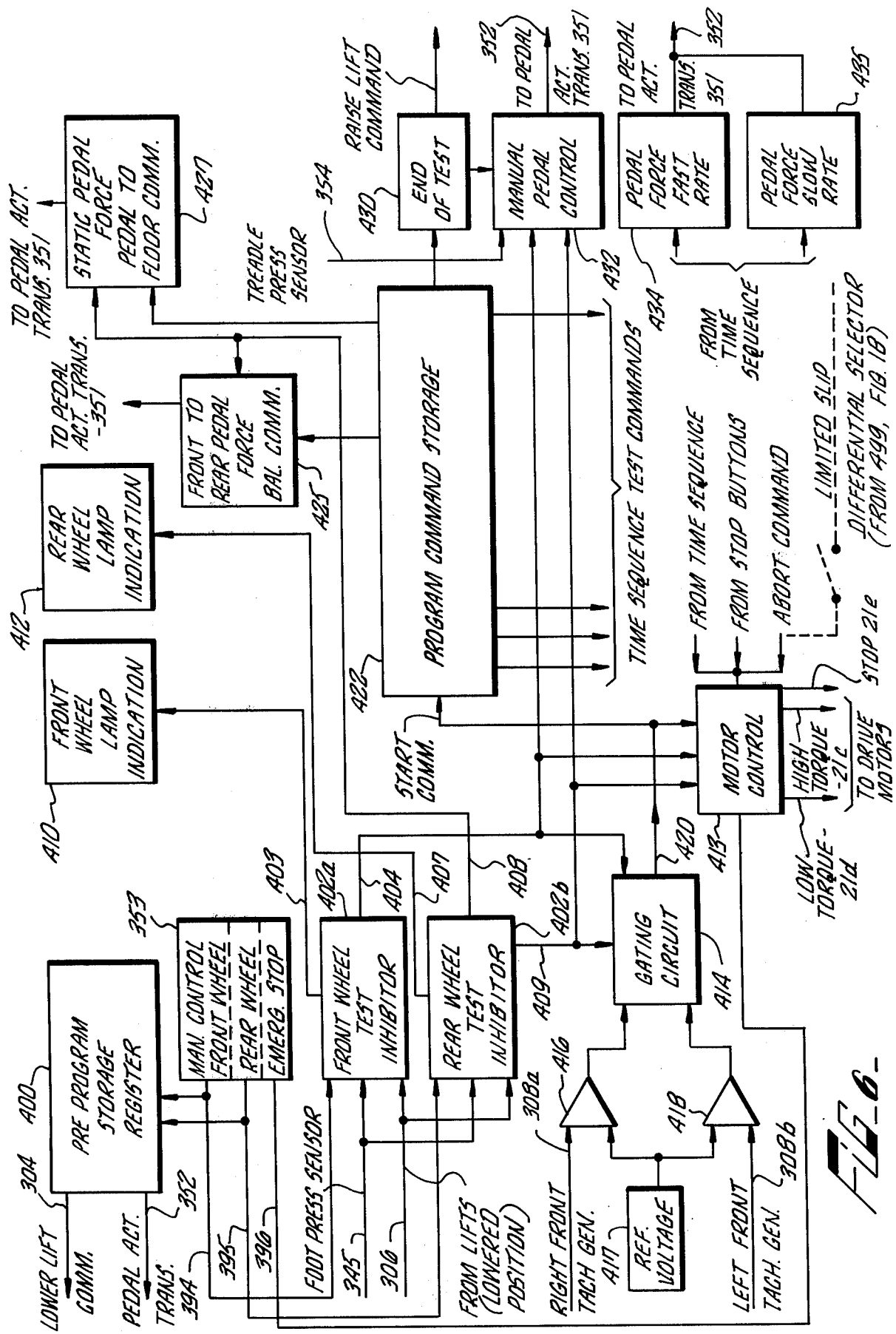
FIG_6

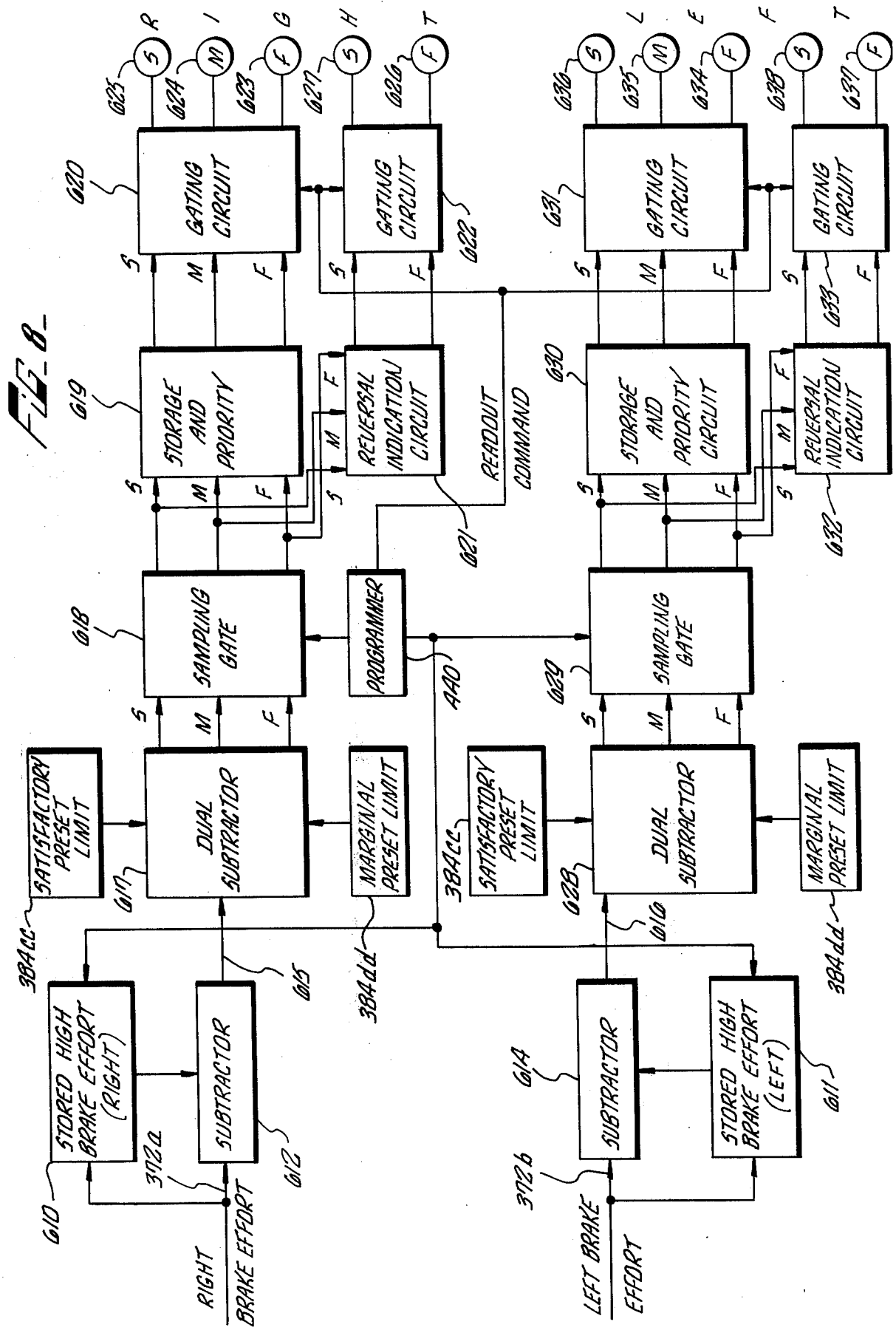

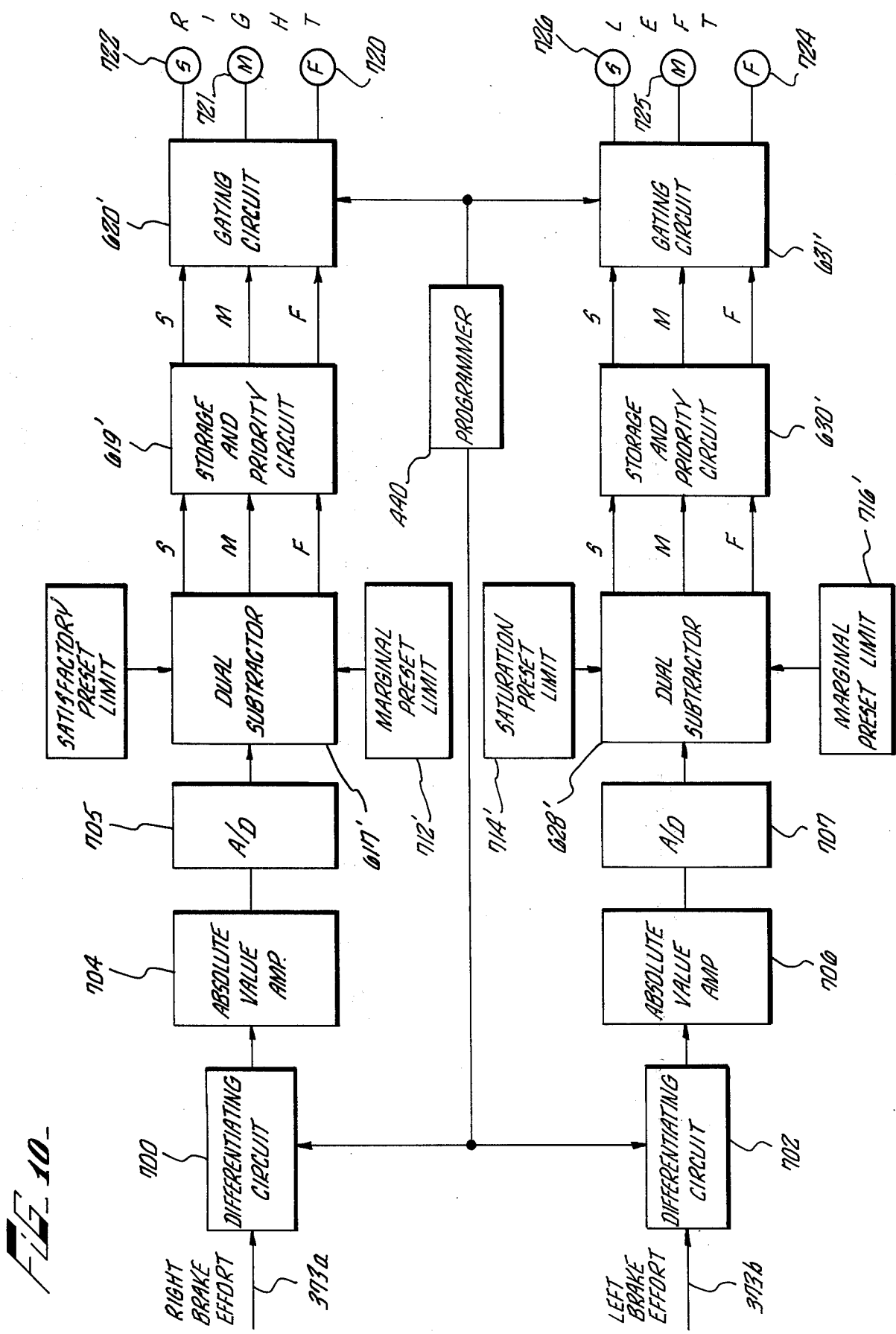

COMPUTER TYPE BRAKE ANALYZER

REFERENCE TO COPENDING APPLICATION

This a continuation in part application of copending application Ser. No. 382,538, filed July 25, 1973 now U.S. Pat. No. 3,899,916 which is a continuation in part of application Ser. No. 811,168 filed Mar. 27, 1969, now abandoned.

BACKGROUND OF THE INVENTION

Field of the Invention

The present invention relates to improved apparatus and systems for testing and diagnosing faults in wheeled, land vehicle brake systems. The invention particularly relates to a computer controlled or automatic brake analyzer system to provide a rapid and reliable analysis of vehicle brakes for purposes of safety and to facilitate repair of defective components.

The present invention is of great importance and practical value because faulty or inadequate vehicle brakes are one of the significant contributing causes to the ever increasing number of automobile accidents. It is well known that brake malfunctions caused by neglect, rather than poor brake design, are responsible for essentially all instances of faulty or inadequate vehicle brakes. Furthermore, in a majority of instances, the neglect of vehicle brakes is not intentional. Rather, the owner simply is not aware of the existence of potentially hazardous conditions.

It is frightening to discover that faulty vehicle brakes frequently respond normally under average driving conditions. Consequently, the driver is lulled into a sense of false security concerning the adequacy of his brakes, and, therefore does not have them inspected, and is completely surprised when a malfunction occurs during emergency deceleration or sudden stops. It is perhaps more unfortunate that a significant number of potentially hazardous, but easily repairable, brake malfunctions are not discovered during routine inspection solely because prior existing inspection methods and equipment do not expose them.

SUMMARY OF THE INVENTION

The present invention relates to a brake testing apparatus of high integrity, which will detect nearly all types of brake malfunction, identify which brake is subject to the malfunction, and further indicate whether the factor causing the malfunction is mechanical, hydraulic or frictional. In many cases an even more specific cause of the detected malfunction can be readily determined and an accurate repair ticket immediately prepared. Furthermore, the present invention relieves the test operator of the task of reading output instruments or manually recording indicated values during the test procedure and thereby reduces test time while greatly increasing accuracy and reliability.

The brake analyzing apparatus of the present invention includes means for selectively driving the wheels of the test vehicle. Thus, each wheel of the vehicle is cradled between a separate pair or rolls rotatably supported by bearings mounted on a frame assembly. A cradle-mounted electric motor is provided as a prime mover for each set of rolls and arranged to drive only the rear rolls of the set through a flexible coupling. Other forms of prime mover can be used, such as a hydraulic or pneumatic motor, or an internal combustion engine. All of these are particularly suitable for portable brake testing apparatus. The rolls are driven at equal controlled speeds up to 45 MPH or more and in the preferred form of apparatus, the brake effort is proportional to the reaction force upon each motor housing and is individually measured for each wheel by a pneumatic weighing unit, or force transducer.

In performing a test, the operator or a computer controlled brake actuator applies predetermined forces to the brake pedal, or other brake actuating means, of the test vehicle in a predetermined testing sequence. When the vehicle brakes are actuated, the braking effort produced at each wheel is proportional to the reaction force upon the corresponding motor housing and is measured by the pneumatic weighing unit or other suitable transducer. Alternatively, the load current, torque or speed change of each driving motor can be measured as an indication of the braking effort being applied to its associated wheel. In the case of hydraulic or pneumatic motors, the pressure will increase with load and provide an indication of torque output.

The measured values of brake effort are monitored during the test period and an output signal, i.e., in the form of an indicating lamp, is produced when the values of brake effort fall within or outside of a predetermined range of acceptable values. The strongest or weakest brake is also identified to facilitate repair work. Standard values of brake effort for different weight classes of vehicles may be stored in a suitable memory and the set of values associated with a vehicle of a given weight class may be chosen by the operator in order to allow interchangeable testing of vehicles of different weights. The output signals may take the form of a lighted display, punched cards or tape, or a printed sheet itemizing the necessary brake repairs.

An evaluation of the test results obtained is made against a set of realistic standard values previously determined through a careful program of testing the behavior of vehicles equipped with brakes having malfunctions, repairing the malfunctions and again testing the behavior of the vehicles with corrected brake systems. The standard values selected enable the behavior of the brakes of each vehicle tested to be classified as satisfactory, marginal, or unsafe. Evaluation of the test results is relatively simple and will identify nearly all conceivable brake malfunctions. In most cases, an exact cause of the malfunction can be identified by a specific symptom of the brake analyzer operation, and in all cases the cause or causes of the malfunction can be categorized as either mechanical, hydraulic, or frictional, or a combination of two or more of these factors.

In accordance with the present invention, an apparatus is provided for analyzing the braking performance of a wheeled vehicle. The vehicle has wheel brakes associated with at least two of the wheels and a brake actuator for simultaneously applying the brakes of said wheels. The apparatus includes test means such as a dynamometer for rotating the wheels of the vehicle for a test period during which the brakes are applied. Brake effort signal generating means are included as a part of the test means for producing a separate brake effort signal for each wheel while the wheel brakes are being applied. The brakes are applied until at least one of the brake effort signals reach a signal representative of a predetermined high level of brake effort, i.e., that level of braking effort which will stop a vehicle traveling at 60 MPH within a reasonable time. The apparatus includes means for storing each of the brake effort signals when the high level is reached. The brakes are continuously applied at the high level either by maintaining the pedal force or position substantially constant for a test period (i.e., 5 to 6 seconds) to simulate a high speed stop. Means are provided for continuously monitoring the current brake effort signals for each wheel brake. The apparatus further includes means responsive to the current and stored brake effort signals for each wheel brake to provide a separate difference brake effort signal for each wheel brake. The different brake effort signals may be compared with satisfactory and marginal values and/or the current brake effort signals may be differentiated and compared with satisfactory and marginal rates of change values to provide an evaluation of brake fade and excursion during the high speed stop simulation test.

BRIEF DESCRIPTION OF THE DRAWINGS

The construction and operation of the invention, as well as additional objects and advantages thereof, will become apparent when the following description is read in conjunction with the accompanying drawings, in which:

FIG. 1 is a diagrammatic view of a brake testing apparatus in accordance with the present invention;

FIG. 2 is a plan view of the brake pedal control unit 332 of FIG. 1 illustrating the placement of the operator's feet thereon in dotted lines;

FIG. 3 is a block diagram of a computer, control and sensor units for use with the apparatus of FIG. 1;

FIG. 4 is a block diagram of analog to digital converters for converting the analog brake effort and pedal force signals to digital format;

FIG. 5 is a block diagram of certain vehicle test limit storage elements for use in the circuit of FIG. 3;

FIG. 6 is a block diagram of a programmer for use in the computer of FIG. 3;

FIG. 7 is a block diagram of certain computer components for controlling the brake pedal actuator during the high level brake effort test;

FIG. 8 is a block diagram of certain computer components for providing brake excursion data during the high level brake effort test;

FIG. 10 is a block diagram of certain computer components for evaluating the rate of change of the brake effort signals during the high level brake effort test.

DETAILED DESCRIPTION OF THE PREFERRED EMBODIMENT

Figure 9:
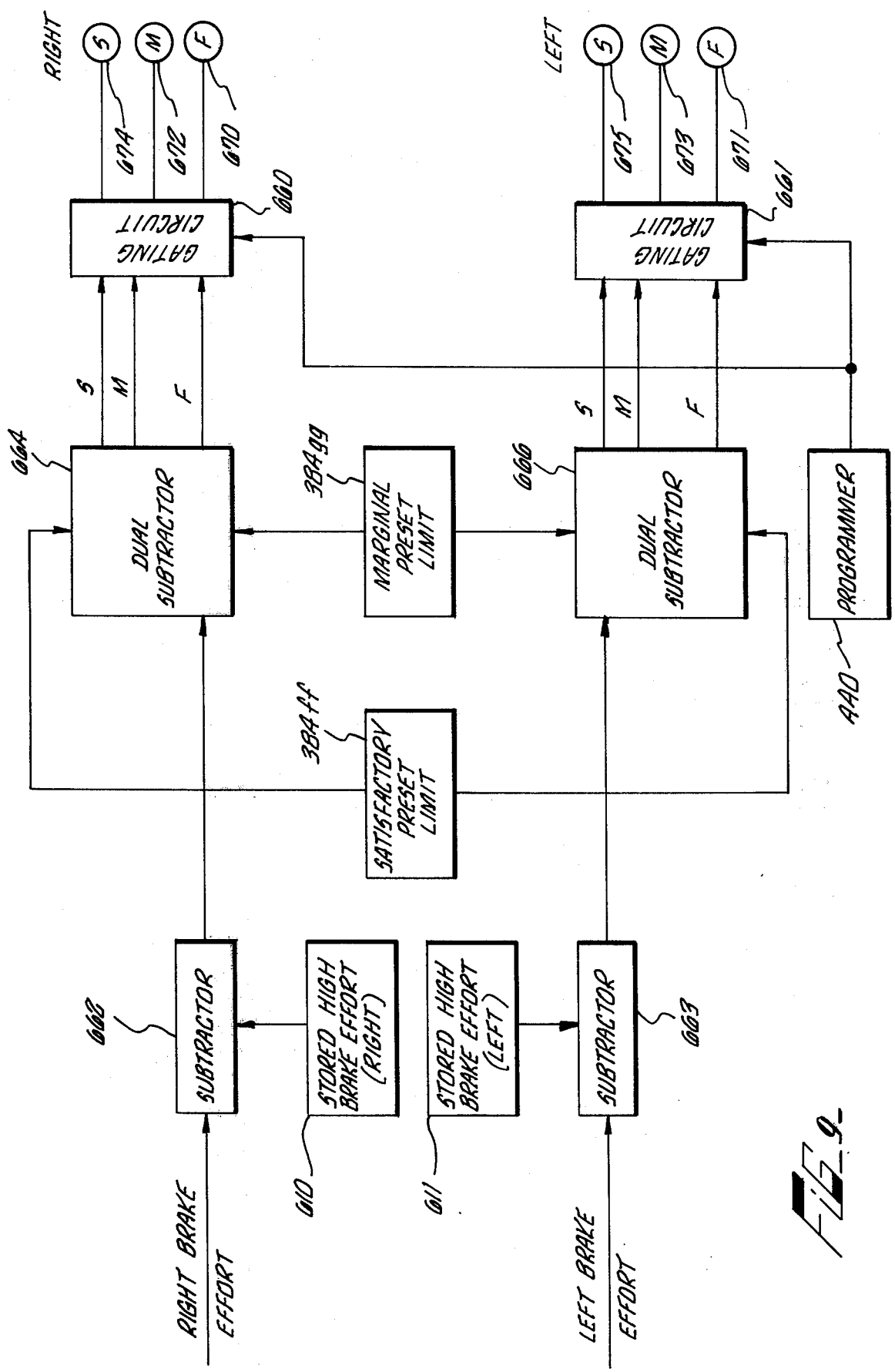
FIG. 9 is a block diagram of certain computer components for providing brake fade test data.

A computer controlled or automatic brake analyzer system for testing vehicle brakes is described in FIGS. 1, 2 and 3. Referring now to FIG. 1, a four-wheeled vehicle is illustrated with the front wheels 11 and 12 cradled between the rollers 14 through 17 or a motoring dynamometer. The rolls 15 and 17 drive the wheels during the test, as will appear later. The rolls 14, 15, 16 and 17 are rotatably supported by bearings mounted in a conventional frame assembly, not shown. The rolls and frame assembly may be arranged in any convenient manner to permit the wheels of the test vehicle to be easily stationed thereon. In an exemplary installation the frame assembly may be mounted in a pit with the rolls at the floor level so that the test vehicle may be readily driven on and off the rolls. The rolls 15 and 17 are oriented so that they are farthest from the front end of the vehicle during a test.

Cradle-mounted electric motor 21 and 22 are provided as driving means for the left and right rolls 15 and 17, respectively. The shafts of the motors are directly coupled to the shafts of the respective drive rolls 15 and 17 by suitable flexible couplings (not shown). The front rolls 14 and 16 are permitted to idle.

A careful balance of motor power and roll spacing is necessary in the described apparatus in order to permit accurate simulation of on-highway speeds and braking conditions. Thus, it has been found that the brake heat produced in stopping a vehicle traveling 60 MPH is about nine times higher than that produced in stopping from 20 MPH. A high integrity testing system may have sufficient power to produce such heat at the brake friction surfaces in the time consumed in a normal highway stop. Thus, neglecting vehicle wind resistance as a retarding force, a 0.5 G deceleration of a 4000 lb. vehicle from 60 MPH to 0 MPH results in an average brake heating rate of 113 btu/sec over a stopping time of 5.48 sec. This power requirement can be met by application of 40 horsepower at each wheel to be tested.

Although on-highway brake friction surface rubbing velocities decrease as the vehicle decelerates, it has been found that test integrity is affected only at extremely high speeds resulting in low brake application forces for a given heating rate and at speeds below the critical rubber velocity of the friction surfaces. Thus, integrity may be retained when tests are performed at one speed so long as the speed selected falls within the wide limits set forth above.

Selection of a particular speed is also dependent upon the tractive effort between the driving rolls 15 and 17 and the tire tread. When a vehicle tire is cradled between two rolls as shown in FIG. 1, pressures less than road contact pressures are present between the tires and each roll. The pressure normal to the roll surface is dependent upon both the roll spacing and the particular roll from which the turning force is applied to the tire. Thus, it should be apparent that as the brakes are applied against rotating drive rolls 15 and 17, the vehicle will tend to move backward. This will reduce the tire contact pressure against the forward idle rolls 14 and 16 and increase the tire contact pressure against the rear drive rolls 15 and 17. Accordingly, application of power to the tires through the rear drive rolls 15 and 17, as shown in the preferred embodiment, has the advantage of increasing the tire-to-roll contact pressure as the brakes are increasingly applied.

The motors 21 and 22 are controlled from a motor control unit activated by computer 299 through lines 21c, d and e to provide a high torque, low torque and to stop. A pair of pneumatic lifts 300a and 300b are positioned between the rolls as illustrated to lift the wheels 11 and 12 off the rollers 14 through 17 in their raised position and thereby permit the test vehicle to be readily driven on and off of the rollers. Once the appropriate wheels are positioned between the rollers 14 through 17, the fluid power lifts are operated by means of appropriate electronic control units such as 302a. The electronic control units operate fluid power pneumatic lift units (303 in FIG. 1) to lower or raise the lifts in response to appropriate control signals on lines 304 and 305, respectively from the computer 299. The lift control units 302a send back a lift lowered signal via line 306 to the computer 299 indicative of the fact that the lifts are in a lowered position so that a selected testing sequence can begin.

Each motor 21, 22 is cradled as in a dynamometer so that a force reaction can be measured from its housing, which is equal to the input force to the rolls and tires. Consequently, as the brakes are applied, their torque resistance to wheel rotation is proportional to motor housing reaction. Since the right and left rolls are not interconnected, the retarding force from each brake can be independently measured by a suitable electrical transducers which provide an output signal proportional to the torque between the respective housing of motors 21 and 22 and the fixed frame. For example, brake effort signal generating transducers 38a and 39a are connected to the motors 22 and 21 to provide output signals representative of the torque applied by the drive motors which, in turn, is representative of the retarding force between the respective wheels and the drive rollers 15 and 17. Only one brake transducer 39a is representative of the retarding force between the respective wheels and the drive rollers 15 and 17. Only one brake effort transducer 39a is shown in FIG. 1 for purposes of illustration. For a more detailed discussion of transducers suitable for measuring the brake effort exerted on a motoring dynamometer, see British Pat. No. 1,284,498 which issued on Dec. 6, 1972.

A pair of tachometer generators 307a and 307b are coupled to the driven rollers 16 and 14 for providing d.c. signals to the computer via lines 308a and 308b having an amplitude proportional to the speed of the respective driven roller. Only generator 307a is illustrated in FIG. 1.

The test vehicle illustrated in FIG. 1 is provided with conventional brake drums and shoes with the brake shoes 320 being forced outwardly against the drums 321 by a manually controlled force responsive brake actuator including a pair of conventional pistons 322 carried within a wheel cylinder 323. Brake fluid is forced through brake lines 324 to operate the wheel cylinder pistons 322 and apply the brakes by means of a conventional master brake cylinder 325 including a piston 326 operated by brake lever 327 in response to a force applied to a brake pedal 328. The brake lever 327 is biased by a spring 330 in position to maintain the brake pedal in its uppermost position to relieve the pressure in the brake lines and permit the brake shoes 320 to be withdrawn from the brake drum by conventional springs, not shown.

A brake pedal actuator control unit 332 for applying a programmed force to the brake pedal 328 is described more particularly in the copending application Ser. No. 382,538 filed July 25, 1973 now U.S. Pat. No. 3,899,916, and assigned to the assignee of this application. The unit 332 includes a frame 333 which comprises a pair of L-shaped legs which rest on the floor 334 of the vehicle under test. A foot treadle 335 is pivotally mounted at the lower end of the frame 333. A piston 336 is mounted within a fluid power cylinder and forces a brake pedal bracket 337 against the brake pedal 328 in accordance with the pressure of the fluid on the piston 336. A pedal force sensor (transducer) 338 is disposed between the bracket 337 and the brake pedal 328 to provide an analog signal on line 340 which is proportional to the force applied to the brake pedal. A pedal-to-floor distance sensing unit 342 provides an output signal on line 343 when the pedal position has become less than the minimum acceptable pedal-to-floor distance.

The foot treadle 335 is biased outwardly away from the frame 333 by suitable springs (not shown) with a force in excess of the maximum pedal force required during the testing sequence. A foot pressure sensor in the form of a micro-switch 345 is actuated when the force exerted by the operator's feet on the treadle 335 exceeds the maximum anticipated pedal force, causing the treadle to move downwardly a predetermined distance against the spring bias. The foot pressure sensor 345 when actuated produces a foot pressure sensor signal on line 346 indicating that the operator is placing sufficient force against the treadle 335 to prevent movement of the brake pedal actuator control unit while the brake pedal is operated at maximum force by the piston 336. Fluid under pressure is applied to the piston 336 for operating the brake pedal via pneumatic line 350 and pedal actuator transducer 351. A pedal position transducer (not shown) is suitably secured to the fluid power cylinder for generating a signal on line 348 which is proportional to the position of the piston 336, for providing information concerning the brake pedal travel during the testing sequence as will be discussed in more detail.

The brake pedal control unit 332 is manually placed within the test vehicle at the beginning of the testing sequence. The operator guides the brake pedal bracket 337 until it engages the brake pedal 328 as shown in FIG. 1. An additional microswitch may be positioned on the bracket 337 to be acutated when the bracket engages the brake pedal thereby providing a signal indicating that the control unit is in place. Rather than remove the brake actuator control unit 332 from the vehicle during the time that the vehicle is moved to change the pair of wheels that are positioned on the dynamometer rollers 14 through 17, the control unit 332 may be left in the vehicle and the brakes controlled by the computer. To provide this type of control, a treadle sensor signal proportional to the force applied by the operator to the treadle may be produced by a suitable transducer and fed back to the computer via line 354. The computer responds to the treadle sensor signal on line 354 to actuate the pedal actuator transducer 351 and apply fluid pressure to the piston 336 which is proportional to the pressure of the operator's feet on the treadle. Such a transducer is described more particularly in copending application Ser. No. 382,538. The operator is thus provided with reliable control of the braking action of the vehicle while it is being driven to place the rear wheels 11a and 12a on the dynamometer rollers.

Referring now to FIG. 3, the computer or automatic control system 299 is actuated by a manual control unit 353 to selectively commence the test sequence for the front or the rear wheels and to stop, via signals on lines 355, 356 and 357, respectively. The computer 299 receives input signals from the lift controls 302a and b indicating that the lifts are in the lowered position and the test vehicle wheels are properly positioned for the test sequence. The computer also receives input signals from the brake effort transducers 38a and 39a, tachometer generators 307a and 307b, foot pressure sensor 345, pedal-to-floor distance sensor 342, and pedal force sensor 338. The computer 299 controls the induction motors 21 and 22 to provide high or low torque ($y$ or $\Delta$ connection) or to stop, via signals on 21c, d and e, respectively. The pedal actuator transducer 351 is controlled via signals on line 352 to apply sufficient force to the vehicle's brake pedal to provide a predetermined brake effort from the strongest brake or a predetermined pedal force as will be discussed in more detail.

The computer may provide output signals on line 361 for recording by a conventional recorder 362, for example, of the strip chart type or magnetic type. The recorder 362 may also be in the form of a printer which provides a printed sheet indicating the condition of the vehicle brakes, with or without recommendations as to suggested corrective work needed, if any. The computer may also apply output signals on line 363 to a visual display arrangement 364 such as a group of lights to provide a recorded indication of appropriate output signals indicating that certain braking characteristics are satisfactory, marginal or unacceptable. The visual display arrangement provides a recordation of such output signals for a time duration in excess of the testing period so that the operator may review the braking performance after the testing sequence has been performed on front, rear or both sets of wheels of the test vehicle.

To determine whether or not the braking performance of the vehicle under test is satisfactory, marginal or unacceptable, pre-established test limits are fed into the computer on line 365 from a vehicle test limits storage arrangement 366, shown in more detail in FIG. 5.

The computer 299 operates on digital signals and thus includes conventional analog-to-digital converters for converting analog input signals into corresponding digital signals. Analog-to-digital converters for providing digital right and left brake effort signals and pedal force signals are illustrated in FIG. 4. Analog signals from the right and left brake effort transducers 38a and 39a are amplified by amplifiers 370a and 370b and converted to binary signals by analog-to-digital converters 371a and 371b. The binary signals representing the right and left brake efforts are supplied on lines 372a and 372b to logic and storage elements within the computer as will be described in more detail. The lines such as 372a and 372b for carrying digital information in the form of multi-bit words between the various computer components illustrated in the drawings are composite lines, that is, one line is used for each bit or N lines for an Nth bit word to transfer the data in parallel form. Thus, each digital data transmission line as shown in the drawings represents a composite of Nth lines.

A subtractor 374 substracts the digital signals representing the right and left brake efforts to produce a braking effort imbalance signal on line 375. Analog signals representing the separate brake effort signals are also supplied to certain computing components via lines 373a and 373b. The right and left brake effort signals on lines 372a, 372b, 373a and 373b represent the gross braking effort or the total retarding force between the left or right wheel 11 or 12 and the respective drive roller 15 or 17. During the time that the brakes are not being applied to the vehicle, the signals on lines 372a, 372b, 373a and 373b represent rolling resistance of the respective wheels and when the brakes are being applied, these signals represent the sum of the rolling resistance and the braking effort contributed by the brake drum and shoe of the respective wheel.

The brake effort imbalance signal on line 375 represents the gross imbalance in the retarding force between the wheels 11 and 12 and the respective drive rollers and thus includes the rolling resistance imbalance of the two wheels. The subtractor 374 also applies an output signal on line 376 having a logic sign (high or low) dependent upon which brake effort signal is the largest. The logic sign of the signal on line 376 thus identifies the strongest (and weakest) brake. For example, a true logic signal (high level) on line 376 may be utilized to indicate that the highest brake effort is supplied by the right brake and a false logic (low level) signal may be used to indicate that the left brake is strongest.

A gate 379 receives the highest brake effort identification signal (true or false) and switches the highest brake effort signal (right or left) to an output line 378. The analog signal from the pedal force sensor 338 is also amplified by amplifier 380 and converted via an analog-to-digital converter 381 to a binary signal representative of the force applied to the brake pedal 328 (FIG. 1) by the pedal actuator 332 (FIG. 1).

Referring now to FIG. 5, there are illustrated vehicle test limits storage elements 384a through 384jj for supplying digital signals representing satisfactory, marginal and unacceptable limits of brake performance of the vehicle under test and the brake effort levels at which the tests are to be conducted. The storage elements of FIG. 5 provide a total of thirty-six output signals on lines 385a through 385jj to the computer. The circuit associated with each of the output lines 385a through 385jj may be of the type shown in FIG. 6 of copending application Ser. No. 382,538. The output signal for any line 385a through 385jj may represent $2^{10}$ or a total of 1024 discrete values.

The storage element 384a of FIG. 5 determines the total brake effort required (front plus rear wheel brakes) for the high level brake effort tests for the particular vehicle. The high level brake effort signal on line 385a may be selected from as many as 1024 discrete values but as a practical matter may be limited to 5 values representing categories of weight of the vehicles being tested. Such categories may, for example, represent (1) small cars, (2) intermediate compacts, compact cars, (3) heavy compact cars, (4) standard cars, and (5) heavy cars. The storage element 384b provides an output signal on line 385b which represents the brake effectiveness percentage between the front and rear wheels of the vehicle under test. For example, the storage element 384b may be set to provide a brake effectiveness of 75% for the front wheels and 25% for the rear wheels, or 60% for the front wheels and 40% for the rear wheels, etc. A one percent variation may be utilized if desired. The storage element 384c provides an output signal representing the pre-hydraulic brake effort factor $X_1$ which is utilized by the computer to arrive at the degree of braking effort utilized to derive certain test data from the vehicle in pre-hydraulic tests as is described in more detail in copending application Ser. No. 382,538. The storage element 384d provides an output signal which represents a comfort level brake effort factor $X_2$ which is utilized by the computer to derive the comfort level brake effort at which brake effort imbalance of the vehicle is measured as is described in copending application Ser. No. 382,538. The storage element 384cc and 384dd provides output signals on lines 385cc and 385dd which represent the satisfactory and marginal excursion limits of brake effort during the high level test. The storage element 384ff and 384gg provides output signals on lines 385ff and 385gg representing the satisfactory and marginal limits, respectively, for fade. The remaining storage elements provide signals representing satisfactory, marginal or acceptable limits for other brake tests for the particular vehicle under test and the value of such signals may be varied in accordance with braking performance requirements dictated by governmental agencies, etc.

It should be noted that only two output signals are utilized from each of the storage elements 384*stuv* and 384*wxyz* at any one time, and the two particular output signal lines that are read by the computer will be determined by the type of brake incorporated into the test vehicles, that is, manual or power brakes.

The vehicle test limit information stored in elements 384*a* through 384*jj* may, of course, be supplied to the computer by other well known recording means such as punched cards, magnetic tape, etc.

A computer programmer is illustrated in FIG. 6 for providing the commands for a complete testing sequence for the front and rear wheels of the test vehicle. The manual control 353 initiates the testing sequence for the front wheels by an appropriate signal on line 394 and initiates the testing sequence of the rear wheels by a signal on line 395. The manual control unit stops the test program and the dynamometer motors by a signal on line 396. A signal on line 394 or 395 actuates a pre-program storage register 400 to provide a signal on line 304 to cause the lift control units to lower the lifts and cradle the front wheels between the rollers 14 through 17. The storage register 400 also provides a signal on line 352 to the pedal actuator transducer 351 to cause the brake pedal actuator 332 to lower the brake pedal bracket 337 until contact is just made with the brake pedal 328. The brakes are not applied by the signal on line 352 from the register 400.

As shown in FIG. 6, signals on lines 394 and 395 from the manual control 353 are also applied to front and rear wheel test inhibitors 402*a* and 402*b*. The wheel test inhibitors also receive signals from the foot pressure sensor 345 via line 346 and from the lift control units via line 306. An appropriate signal (true or false) on all input circuits of either wheel test inhibitors will provide an output signal (i.e. true) on the respective output lines 403 and 404 or 407, 408 and 409.

Front and rear wheel lamp indicators 410 and 412 are responsive to signals on lines 403 and 407 to indicate which set of wheel brakes are undergoing tests. An output signal on line 404 or 409 initiates operation of the motor control 413 which, in turn, applies an appropriate signal on output line 21*d* to energize the induction dynamometer motors 21 and 22 in a low torque configuration, e.g. Y connection. The dynamometer motors rotate drive rollers 15 and 17 which, in turn, rotate the left and right wheels of the vehicle. The vehicle wheels, in turn, drive the driven rollers 16 and 14 which rotate tachometer generators 307*a* and 307*b*. Under certain abnormal conditions some slippage may occur between the tires and the drive rollers 15 and 17 which causes the driven rollers 14, 16 to rotate at a slower speed than the drive rollers 15, 17. The coefficient of friction, influenced, for example, by water between the tires and rollers is an important factor in determining slippage. Thus, the driven rollers 14 and 16 will begin to catch up to the drive rollers 15 and 17 as the surface of the tires dry off.

Each of the tachometer generators 307*a* and 307*b* produce a d.c. signal having a magnitude proportional to the rotational speed of the respective driven rollers 16, 14. The signals from the tachometer generators are supplied to one input of a pair of differential amplifiers 416 and 418. The other input of each of the differential amplifiers is connected to a reference voltage source 417. The differential amplifiers 416 and 418 are arranged to provide an appropriate output signal (high level) to a gating circuit 414 only when the output signal from the respective tachometer generator exceeds the reference voltage. An output signal from each differential amplifier is indicative of the fact that both driven rollers are within a predetermined range of the normal induction motor speed representing, for example, a vehicle speed of 45 MPH.

A gating circuit 414 produces an output signal on line 420 in response to output signals from both comparators 416 and 418 and an output signal on line 404 or 409. The output signal on line 420 causes the motor control unit 413 to change the energization of the drive motors to a high torque configuration e.g., Δ connection, via a signal on line 21*c*. An output signal on line 420 is also supplied to a program command storage 422 to initiate time sequence test commands to the various components of the computer as will be described in more detail. For example, the program command storage provides command signals to a front to rear pedal force balance command control unit 425. The unit 425 in response to the command signal from storage 422 and a signal from the rear wheel test inhibitor via line 408 provides a signal to the pedal actuator transducer 351 to actuate the brakes in the front to rear pedal pressure balance tests to be described.

The program command storage also provides appropriate signals to command unit 427 to initiate a static pedal force and pedal to floor test. At the end of a test sequence, the program command storage supplies a signal to an end of test control unit 430 which sends a signal on line 305 to the lift control units to raise the lifts so that the vehicle may be moved. A manual pedal control unit 432 when enabled by a signal from unit 430 responds to a signal from the treadle pressure sensor on line 354, and provides a signal proportional thereto on line 352 to control the brake pedal actuator 332 in accordance with the operator's foot pressure on the treadle. This permits the vehicle to be moved without removing the ctuator 332. The manual pedal control unit 432 is inhibited by a signal on either line 404 or 409 indicating that a test sequence is still under way. Fast and slow rate pedal force control units 434 and 435 apply signals to the pedal actuator transducer 351 to provide a fast or slow rate of brake application as will be described.

The detailed function of the components of the automatic control system 299 for controlling the vehicle brakes and for monitoring the braking effort signals etc., in a multi-step testing sequence is described in detail in my copending application Ser. No. 382,538 now U.S. Pat. No. 3,899,916. Only those components and testing steps which relate to the present invention of apparatus for evaluating high level excursion and fade are described in detail here.

Preparatory to commencing the test sequence, it is necessary that each of the vehicle test limit storage elements 384*a* through 384*jj* be adjusted to provide the appropriate output signal. The category of weight of the vehicle, i.e., compact, etc., percent of balance between front and rear brakes, use of power or manual brakes are reflected by appropriate adjustments in storage elements 384*a* and 384*b*, 384*stuv* and 384*wxyz*. The acceptable or marginal and fail limits as established by the remaining storage elements will remain the same for many vehicles.

An anti-skid and limited slip differential switch may also be manually set by the operator prior to the commencement of the test sequence. An anti-skid switch (not shown) permits the operator to determine whether the anti-skid test will be performed on the front and/or rear wheel brakes. A limited slip differential switch permits the operator to override an abort command when the maximum rolling resistance of either wheel exceeds a preset maximum limit as is described in more detail in the copending application Ser. No. 382,538 now U.S. Pat. No. 3,899,916.

To initiate the test sequence, the vehicle is driven into the test area until the front wheels are positioned between the dynamometer rollers 14 through 17 (FIG. 1). The brake pedal actuator control unit 332 is positioned over the brake pedal and the pedal bracket 337 is positioned over the brake pedal and the pedal bracket 337 is guided into engagement with the brake pedal. The manual control 353 is then actuated by the operator while seated behind the vehicle steering wheel to initiate testing of the front wheels.

Referring now to FIG. 6, the hydraulic lifts are lowered by the preprogrammed storage register 400 and the motors are energized in the low torque configuration as discussed previously. When the driven rollers 14 and 16 have reached a predetermined percentage of the test or induction motor speed, i.e. 75%, the gating circuit 414 actuates the motor control 413 to energize the dynamometer motors in the high torque configuration. The gating circuit 414 also provides a signal to the program command storage which, after a predetermined time delay, for example, two seconds to enable the dynamometer rollers to arrive at the final test sequence speed, e.g. 45 MPH, issues test commands to the various components to the system to begin the testing operation.

EXCURSION TEST

The excursion test data is obtained by the circuit of FIG. 8. The results of the excursion test inform the operator of whether (1) the brake effort of either wheel has increased in value above a present limit and (2) increased above such limit and then subsequently decreased again below such limit, during the high level brake effort test (i.e. 5 or 6 seconds).

Referring now to FIG. 7, force is applied to the brake pedal at a slow rate (e.g. 25 lbs. of brake effort per second) via the slow rate control unit 435, the brake actuator transducer 351 (FIG. 1) and the brake pedal control unit 332 (FIG. 1). The highest brake effort signal in line 378 is monitored and compared by comparator 572 with the predetermined high level of brake effort to be used during the test. The high level brake effort Y is obtained by multiplying the high level brake effort value stored in element 384a by the appropriate brake effectiveness percentage selection for the wheel brakes under test (front or rear) via element 384b. Element 384b may be set to provide 75% for the front wheel brakes and 25% for the rear wheel brakes. When the highest brake effort reaches the selected high level brake effort, the position of the brake pedal or the force applied to the pedal may be maintained substantially constant for the remainder of the high level test (e.g. 5 or 6 seconds) to provide a substantially constant level of brake application. It should be noted that the brakes may fade or increase in intensity (excursion) during the high level test. The term "substantially constant level of braking effort" as used herein includes such changes in the brake effort of the individual wheel brakes which would be expected during a high speed stop of the vehicle being tested.

Referring now to FIG. 8, at the beginning of the high level brake effort test, e.g. when the highest brake effort has reached the predetermined high level brake effort, the right and left brake effort signals are stored in storage elements 610 and 611 via an appropriate storage command signal from programmer 440. The right and left brake effort signals are then continuously compared with the respective initially stored values by means of subtractors 612 and 614, respectively. The output signals from the subtractors 612 and 614 thus represent in digital format the difference signal between the instantaneous or current values of the right and left brake efforts and their respective initially stored values. The computer components for comparing the output signals from the right and left brake effort subtractors 612 and 614 are identical and for that reason only the components associated with right brake effort subtractor 612 will be discussed in detail.

The output signal from the right brake effort subtractor 612 on line 615 is applied to a dual subtractor 617 which compares this difference signal with satisfactory and marginal preset limits stored in elements 384cc and 384dd. The dual subtractor 617 provides an appropriate output signal (i.e. high level) on one of its output lines marked S, M or F. An output signal on line F is indicative of the fact that the difference between the instantaneous right brake effort signal and the initially stored right brake effort signal has exceeded the marginal preset limit. By the same token, a signal on output line M is indicative of the fact that the difference between the instantaneous value of the right brake effort signal and the initially stored right brake effort signal falls between the marginal and satisfactory preset limits. A signal on output line S of the dual subtractor 617 is indicative of the fact that the difference between the instantaneous and initial values of the right brake effort has not exceeded the satisfactory preset limit.

A sampling gate 618 (similar to gate 598 of FIG. 19) is enabled by the programmer 440 and continuously samples and transfers to output lines S, M and F, the satisfactory, marginal or fail signals, respectively, from the subtractor 617. A storage and priority circuit 619 continuously samples and stores the existing conditions of the satisfactory, marginal and fail output lines from the gate 618. The priority circuit 619 assigns priorities to the output lines S, M and F so that the F line has the first priority, the M line the second priority and the S line the least priority. The priority circuit 619 continuously updates the signal on its output lines S, M and F to represent the worst brake condition, as for example, if the difference between the instantaneous and stored right brake effort signals at some point during the high level test exceeds the marginal preset limit, then the subtractor 617 will provide a fail output signal on the output line F, and the sampling gate 618 will, in turn, provide a fail signal in its output line F. The storage and priority circuit 619 will respond to the fail signal and produce an output signal on its output line F indicating a fail condition. If the difference between the instantaneous and stored right brake effort signals later falls below the marginal preset limit to cause the subtractor 617 and the sampling gate 618 to change the output signal to a marginal output signal on line M, then the storage and priority circuit 619 will continue to provide only a fail output signal on line F.

A reversal indication circuit 621 receives the output signals from the sampling gate 618 on lines S, M and F and provides satisfactory or fail output signals on lines S or F. The reversal indication circuit 621 provides a fail indication signal on its output line F when the output signal from the dual subtractor 617 and sampling from gate 618 change from a fail to a marginal output signal or from a marginal to a satisfactory output signal, indicating that the brake performance has exceeded the marginal or satisfactory preset limits and then fallen below such limits during the period of the high level test. The reversal indication circuit 621 provides a satisfactory output signal on its output line S when the output signals from the subtractor 617 and gate 618 do not reverse, that is when the difference between the instantaneous and stored right brake effort signals do not exceed and then fall below the marginal or satisfactory preset limits.

At the end of the high level brake effort test, the programmer 440 provides a readout command signal to gating circuits 620 and 622. The gating circuit 620 when enabled energizes (1) a fail indicating lamp 623 in response to a signal on output line F from the periphery circuit 619, or (2) a marginal indicating lamp 624 in response to a signal on output line M from priority circuit 619, or (3) a satisfactory indicating lamp 625 in response to a signal on output line S from priority circuit 619. Gating circuit 622 when enabled energizes a fail indicating lamp 626 in response to a signal on output line F of reversal indication circuit 621. The gating circuit 622 when enabled energizes a satisfactory indicating lamp 627 in response to a satisfactory signal on output line S of reversal indication circuit 621.

The indicating lamps 623 through 627 thus inform the operator of whether the difference between the instantaneous and stored values of the right brake effort signals have (1) exceeded the marginal or satisfactory preset limits at any time during the high level brake effort test, and (2) whether such difference has exceeded the marginal or satisfactory preset limit and then fallen below such limit during the high level test.

A dual subtractor 628, sample gate 629, storage and priority circuit 630, reversal indication circuit 632 and gating circuits 631 and 633 function in the same manner as the corresponding elements for the right brake. Such elements 629 through 633 energize a fail, marginal or satisfactory indication lamp 634, 635 or 636 when the difference between the instantaneous and stored value of left brake effort (1) exceeds the marginal preset limit, or (2) falls between the marginal and satisfactory preset limits, or (3) remains below the satisfactory preset limit during the high level test. The elements 629 through 633 also energize a fail or satisfactory indicating lamp 637 or 638 when the difference between the instantaneous and stored left brake effort signal exceeds and then falls below the satisfactory or marginal preset limit during the high level brake effort test.

FADE TEST

The circuit of FIG. 9 checks the brakes for excessive fade, or excessive reduction in brake effort at the end of the high level test. The programmer 440 enables gating circuits 660, 661 at approximately the end of the high level test. The right and left brake effort signals are subtracted from the initial stored values by subtractors 662 and 663. The difference between the brake effort signals at the end of the high level test and the initial brake effort signals are compared with maximum satisfactory and marginal preset limits by dual subtractors 664 and 666. The gating circuits 660 and 661 energize failure indicating lamps 670 and 671 when the final brake effort signals are less than the initial brake effort signals of the respective wheels by an amount which exceeds the marginal preset limit as determined by storage element 384gg. The marginal indicating lamps 672 and 673 are energized when the final brake effort signals are less than the initial brake effort signals by an amount which falls between the marginal and satisfactory preset limits and the satisfactory indicating lamps 674 and 675 are energized when the differnce between the initial and final brake effort signals is less than the maximum satisfactory preset limit.

BRAKE EFFORT RATE OF CHANGE DURING HIGH LEVEL TEST

The circuit of FIG. 10 checks the brakes for excessive rate of change during the high level test. The programmer 440 enables a pair of differentiating circuits 700 and 702 at the beginning of the high level test (when the highest brake effort reaches a preset level as determined by the circuit of FIG. 7). The current or instantaneous values of the right and left brake effort signals (analog) on lines 373a and 373b are applied to inputs of the differentiating circuits 700 and 702. The output signals from the differentiating circuits represent the rate of change of the current brake effort signals. These output signals may be positive or negative depending upon whether the respective brake effort signal is declining or rising in value. The output signals from the differentiating circuits 700 and 702 are applied to absolute value amplifiers 704 and 706. The output signals from the amplifiers 704 and 706 represent the rate of change of the right and left brake effort signals in absolute value.

The signals from the amplifiers 704 and 706 (representing brake effort rate of change) are converted to digital format via analog to digital converters 705 and 707, and applied to dual subtractors 617' and 628' of the type described in connection with FIG. 8. The brake effort rate of change signals are compared in the dual subtractors 617' and 628' with the preset satisfactory and marginal limits stored in elements 710', 712', 714' and 716' as illustrated. An output signal is provided on output line F of either subtractor 617' or 628' when the input signal has exceeded the marginal preset limit stored in elements 712' and 716'. An output signal is provided on output lines M and S when the input signal to the subtractors fall between the satisfactory and marginal preset limits and remains below the satisfactory preset limit, respectively. The storage and priority circuits 619' and 630' function in the same manner as the corresponding circuits 619 and 630 discussed in FIG. 8, to provide an output signal on output lines F or M when the brake effort rate of change signal exceeds the preset marginal or satisfactory limits at any time during the high level test.

Gating circuits 620' and 631' when enabled by a readout command signal from programmer 440, for example at the end of the high level test, energize (1) fail indicating lamps 720 and 724 in response to output signal on output line F of the associated storage and priority circuits, (2) marginal indicating lamps 721 and 725 in response to output signal on line M of associated storage and priority circuit, and (3) satisfactory indicating lamp 722 and 726 in response to an output signal on line S of the associated storage and priority circuit. The output indicating lamps 720 through 722 (right) and 724 through 726 (left) thus inform the operator of whether the rate of change of the right or left brake effort signals has exceeded the satisfactory or marginal preset limits.

If desired, different preset limits may be used for evaluating rates of brake effort change with increasing and decreasing braking effort by an obvious modification of the circuit of FIG. 10.

The brake analyzer apparatus and method of my invention described above measures and compares certain braking performance characteristics such as brake effort imbalance when the strongest brake reaches a predetermined brake effort, e.g., prehydraulic, comfort level and high level. It should be understood that the brake effort level used for such tests may be the sum of the individual brake efforts of the two wheel brakes under test instead of the brake effort reached by the strongest brake. It is only necessary that at least one of the brake effort signals (e.g., one or the sum of both signals) reach a signal representative of a pre-established brake effort to analyze certain of the vehicle braking performance characteristics discussed above.

Logic circuits which may be used in the block diagrams discussed in FIGS. 8, 9 and 10 are illustrated in copending application Ser. No. 382,538 now U.S. Pat. No. 3,899,916.

There has thus been described an automatic brake analyzer for evaluating the fade and excursion phenomena of a vehicle's brakes. Various modifications to the circuits will be obvious to those skilled in the art without departing from the scope of my invention as defined by the appended claims.

What is claimed is:

1. In an apparatus for analyzing the braking performance of a wheeled vehicle having wheel brakes associated with at least two wheels, the combination which comprises:
test means for rotating said wheels of the vehicle for a test period;
brake effort signals generating means including the test means for producing a separate brake effort signal for each wheel, each brake effort signal being proportional to the brake effort of the respective wheel while the wheel brakes are being applied; and
brake effort change signal generating means responsive to the brake effort signals for producing satisfactory or fail brake effort change signals when the change in each brake effort signal remains below a preset maximum acceptable value or the change in one of the brake effort signals exceeds the preset maximum acceptable value, respectively, when the wheel brakes are applied to provide a substantially constant high level of brake application during the test period.

2. The combination as defined in claim 1 wherein the brake effort change signal generating means includes:
means for storing the initial values of each of the brake effort signals when at least one of the brake effort signals reaches a signal representative of a predetermined brake effort and means for comparing the current brake effort signals with the stored initial values of brake effort and producing a separate difference brake effort signal for each wheel brake during the test period, the difference brake effort signal being representative of the difference between the stored and current values of the brake effort for the respective wheel brake.

3. The combination as defined in claim 2 wherein the brake effort change signal generating means further includes:
means for comparing the differnce brake effort signals with preset acceptable limits of positive and negative deviations from the initial stored values.

4. The combination as defined in claim 1 wherein the brake effort change signal generating means includes:
means for determining the rate of change of each of the brake effort signals during the test period.

5. The combination as defined in claim 4 wherein the brake effort change signal generating means further includes:
means for comparing the rate of change of the brake effort signals during the test period with preset acceptable limits.

6. The combination as defined in claim 1 wherein the vehicle is provided with a manually controlled force responsive brake actuator for simultaneously applying the wheel brakes and including:
means for applying force to the brake actuator to maintain said predetermined high level of brake application for the test period.

7. In an apparatus for analyzing the braking performance of a wheeled vehicle having wheel brakes individually associated with at least two wheels, the combination which comprises:
test means for rotating said wheels of the vehicle for a predetermined test period;
brake effort signal generating means including the test means for producing separate brake effort signals for each wheel, each brake effort signal being proportional to the brake effort of the respective wheel while the wheel brakes are being applied;
means for storing the initial values of each of the brake effort signals when at least one of the brake effort signals reaches a signal representative of a predetermined brake effort;
means for monitoring the current brake effort signals during the test period; and
means responsive to the stored and current brake effort signals for each wheel brake for producing a separate difference brake effort signal for each wheel brake during the test period, the difference brake effort signal being representative of the difference between the stored and current values of the brake effort for the respective wheel brake.

8. The combination as defined in claim 7 including means for producing a satisfactory or fail excursion signal when each difference brake effort signal remains below a preset maximum acceptable value or one of the difference brake effort signals exceeds the preset maximum acceptable value during the test period, respectively.

9. The combination as defined in claim 8 including means for producing a marginal excursion signal when each of the brake effort signals remains below said preset maximum acceptable value and at least one of the brake effort difference signals exceeds a preset marginal value during the test period.

10. The combination as defined in claim 7 wherein the vehicle is provided with a manually controlled force responsive brake actuator for simultaneously applying the wheel brakes and including:

means for applying force to the brake actuator until said predetermined high level of brake effort is reached and for maintaining a high level of brake application for a predetermined period of time.

11. The combination as defined in claim 7 including means responsive to the difference brake effort signals for producing a fail brake effort excursion reversal signal when either of the current brake effort signals exceeds the initial stored value of the respective brake effort by a value greater than a preset value and subsequently decreases below said preset value during the test period.

12. The combination as defined in claim 7 including means responsive to the difference brake effort signals for producing a fail brake effort fade signal when either of the brake effort signals falls below the initial stored value of the respective brake effort by an amount greater than a preset maximum acceptable value.

13. The combination as defined in claim 12 including means responsive to the difference brake effort signals for producing a marginal brake effort fade signal when either of the brake effort signal falls below the initial stored value of the respective stored brake effort by an amount greater than a preset marginal value.

14. The combination as defined in claim 7 including means responsive to the difference brake effort signal for producing a satisfactory brake effort fade signal when either of the brake effort signals remains greater than the remainder of the initial stored value of the respective stored brake effort minus a preset acceptable value.

15. In an apparatus for analyzing the braking performance of a wheeled vehicle having wheel brakes individually associated with at least two wheels, the combination which comprises:

test means for rotating said wheels of the vehicle;
brake effort signal generating means including the test means for producing separate brake effort signals for each wheel, each brake effort signal being proportional to the brake effort of the respective wheel while the wheel brakes are being applied; and
means responsive to the brake effort signals for each wheel brake for producing a separate rate of change brake effort signal for each wheel brake, each rate of change brake effort signal being representative of the rate of change of the brake effort for the respective wheel brake.

16. The combination as defined in claim 15 including means for producing a satisfactory or fail rate of change signal when each rate of change brake effort signal remains below a preset maximum acceptable value or at least one of the rate of change brake effort signals exceeds the preset maximum acceptable value, respectively.

17. The combination as defined in claim 15 wherein the vehicle is provided with a manually controlled force responsive brake actuator for simultaneously applying the wheel brakes and including:

means for applying force to the brake actuator until a predetermined high level of brake effort is reached and for maintaining a high level of brake application for a predetermined period of time.

18. The combination as defined in claim 16 including means for producing a marginal rate of change signal when each of the rate of change brake effort signals remains below said preset maximum acceptable value and at least one of the rate of change brake effort signals exceeds a preset marginal value.

* * * * *

UNITED STATES PATENT AND TRADEMARK OFFICE
CERTIFICATE OF CORRECTION

PATENT NO. : 4,024,756
DATED : May 24, 1977
INVENTOR(S) : Edwin L. Cline

It is certified that error appears in the above-identified patent and that said Letters Patent are hereby corrected as shown below:

Column 4, line 15, delete "may" and insert --must--.

Column 5, line 19, after "brake" insert --effort--.

Column 13, line 26 and 27, delete "periphery" and insert --priority--.

Column 16 and 17 the body of Claims 9 and 10 should be reversed.

Signed and Sealed this

Eighth Day of November 19;

[SEAL]

Attest:

RUTH C. MASON
Attesting Officer

LUTRELLE F. PARKER
Acting Commissioner of Patents and Trademar